(12) United States Patent
Lee et al.

(10) Patent No.: US 8,502,487 B2
(45) Date of Patent: Aug. 6, 2013

(54) MOTOR ENERGY RECYCLING DEVICE

(75) Inventors: Hsiang-Yu Lee, New Taipei (TW);
Ping-Tsun Lin, Taipei (TW)

(73) Assignee: SuperC-Touch Corporation, New Taipei (TW)

( * ) Notice: Subject to any disclaimer, the term of this patent is extended or adjusted under 35 U.S.C. 154(b) by 86 days.

(21) Appl. No.: 13/312,110

(22) Filed: Dec. 6, 2011

(65) Prior Publication Data
US 2012/0139462 A1 Jun. 7, 2012

(30) Foreign Application Priority Data
Dec. 7, 2010 (TW) .............................. 99142605 A (51) Int. Cl.
*H02P 27/00* (2006.01)
*H02P 1/10* (2006.01)
*G05F 3/00* (2006.01)

(52) U.S. Cl.
USPC .................. 318/400.31; 388/857; 323/217

(58) Field of Classification Search
USPC ...................................................... 318/400.3
See application file for complete search history.

(56) References Cited

U.S. PATENT DOCUMENTS

| | | | | |
|---|---|---|---|---|
| 8,406,025 B1* | 3/2013 | Alexander | .................. | 363/132 |
| 2003/0107905 A1* | 6/2003 | Miura et al. | .................. | 363/41 |
| 2008/0013351 A1* | 1/2008 | Alexander | .................. | 363/123 |
| 2011/0221376 A1* | 9/2011 | Ohshima et al. | .............. | 318/501 |

OTHER PUBLICATIONS

Bochkarev, Series-excitation DC motor drive has auxiliary thyristor connected by anode to switching capacitor and to cathode of diode connected by anode to another switching capacitor, Jun. 23, 1984, Derwent SU 1099371.*
Shevtsov, Rail traction DC drive has independent regulation of excitation current by thyristor through thyristor regulator in series with the excitation winding, Jul. 23, 1987, Derwent SU 1325652.*

* cited by examiner

*Primary Examiner* — Eduardo Colon Santana
*Assistant Examiner* — Bickey Dhakal
(74) *Attorney, Agent, or Firm* — Muncy, Geissler, Olds & Lowe, PLLC (57) ABSTRACT

A motor energy recycling device is connected to a motor, a voltage regulating power capacitor, and a switch unit, for storing energy released by the motor. The motor energy recycling device include a switching device having first to third ends for being switched to connect the third end with the first end or second end; a first diode unit; a first capacitor connected to the motor and the first diode unit for using energy released by the motor to charge the first capacitor; a first inductor; a second capacitor; a second diode unit; and a second inductor connected between the second end and the second diode and between the voltage regulating power capacitor and the second capacitor for charging the voltage regulating power capacitor via the second inductor to accomplish an energy recycling.

9 Claims, 7 Drawing Sheets

MOTOR ENERGY RECYCLING DEVICE

CROSS REFERENCE TO RELATED APPLICATION

This application claims the benefits of the Taiwan Patent Application Serial Number 099142605, filed on Dec. 7, 2010, the subject matter of which is incorporated herein by reference.

BACKGROUND OF THE INVENTION

1. Field of the Invention

The present invention relates to an energy recycling device and, more particularly, to a motor energy recycling device, which is capable of recycling the not-used energy released from magnetic field changes when the motor controlled by pulse width modulation.

2. Description of Related Art

Figure 1A:
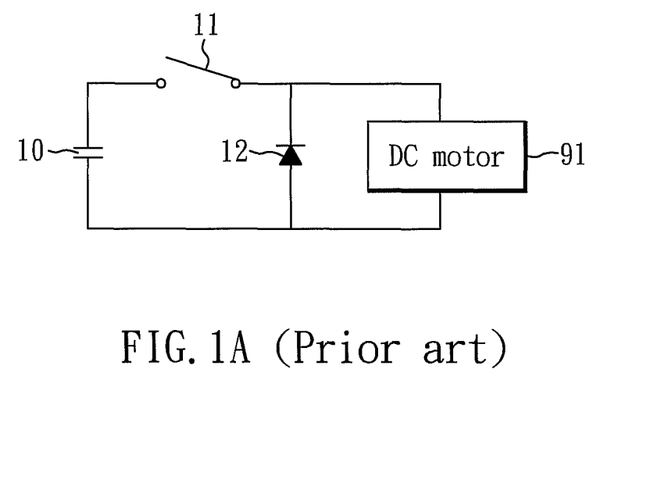
FIG. 1A illustrates the control circuit for a typical DC motor.
Figure 1B:
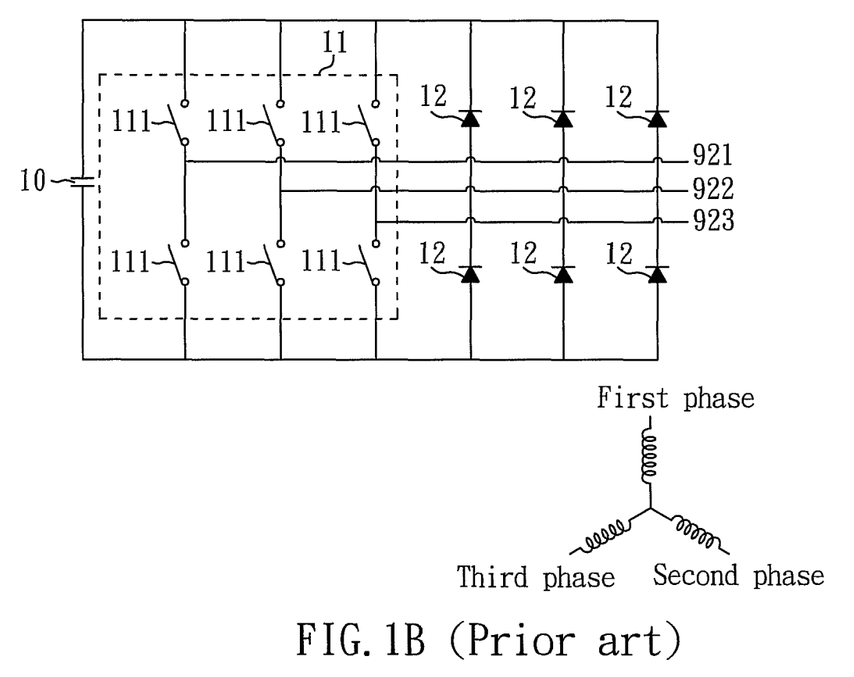
FIG. 1B illustrates the control circuit for a typical three phase AC motor.

With reference to FIGS. 1A and 1B, FIG. 1A illustrates the control circuit for a typical DC motor, and FIG. 1B illustrates the control circuit for a typical three phase AC motor. As shown in FIG. 1A, the control circuit includes a voltage regulating power capacitor 10, a switch unit 11, and a diode 12. The voltage regulating power capacitor 10 supplies power to a DC motor 91. The switch unit 11 controls power supply to the DC motor 91. The diode 12 is preferably a flywheel diode. When the switch unit 11 is off, the control circuit maintains a current loop of the DC motor 91 so as to convert the energy stored in a magnetic field of the DC motor 91 into electric power. Further, the electric power passed through the diode 12 and is changed into a thermal energy to dissipate. As shown in FIG. 1B, the three phase AC motor has a first phase 921, a second phase 922, and a third phase 923 with a phase difference of 120-degree therebetween. The control circuit includes a voltage regulating power capacitor 10, a switch unit 11, and six diodes 12. The voltage regulating power capacitor 10 supplies power required for the first phase 921, the second phase 922, and the third phase 923 respectively. The switch unit 11 includes six switches 111 to control the first phase 921, the second phase 922, and the third phase 923 to be in or out, respectively, in order to configure the three phase AC motor into a one-in/two-out or two-in/one-out mode to thereby form a loop for running the three phase AC motor. The diodes 12 each is preferably a flywheel diode.

Typically, in a pulse width modulation (PWM) operation, a pulse signal is used as an input current to control the power of the motor. As shown in FIGS. 1A and 1B, the control circuit of the pulse width modulation can turn on/off the switches 11 continuously based on an appropriate operating frequency. By adjusting the ratio of on-time and off-time of the switch unit 11, it is able to adjust the input energy of the DC motor 91 or the three phase AC motor.

When the motors are controlled in such a way, the motors are kept in a cycle of increasing and decreasing of magnetic fields. When the magnetic field is decreased, the energy released by the motor is consumed by the diodes 12 in a form of heat. In this case, in every cycle of on/off of the switch unit 11, the energy released by the motor is wasted.

To overcome this, a capacitor is typically added over the diodes to thereby store the energy released by the motor, and the energy stored in the capacitor can reversely charge the power capacitor immediately. Thus, when the capacitor performs a reverse energy charging, the voltage of the power capacitor instantaneously increases, and the rotating speed of the motor is increased sharply, which may cause vibration of the motor and result in a security problem or a difficulty in control of the motor. In addition, the energy stored in the capacitor can be expressed as $\frac{1}{2}CV^2$, where C is the capacitance of the capacitor and V is the voltage of the capacitor. If the voltage of the capacitor cannot be accumulated to a certain high value, a relative large amount of energy may be consumed by the recycling circuit during the energy recycling process, resulting in severely reducing the recycling performance.

Therefore, it is desirable to provide an improved motor energy recycling device to mitigate and/or obviate the aforementioned problems.

SUMMARY OF THE INVENTION

The object of the present invention is to provide a motor energy recycling device, which can safely recycle the energy released by a motor and evenly deliver the recycled energy to a power capacitor.

To achieve the object, there is provided a motor energy recycling device to store energy released by a motor, which is connected to the motor, a voltage regulating power capacitor for providing power required for the motor, and a switch unit to control the motor. The motor energy recycling device comprises: a switching device having a first end, a second end and a third end, wherein the switching device is switched to connect the third end with the first end or the second end; a first diode unit; a first capacitor connected to the motor; the first diode unit makes energy released by the motor to charge the first capacitor; a second capacitor connected to the third end; one end of a first inductor connected to the first end and the other end of the first inductor connected between the first capacitor and the first diode; and a second end of the switching device connected between one end of the second capacitor and one end of the second diode; and the other end of a second diode connected one end of voltage regulating power capacitor; the other end of the second inductor connected the other end of voltage regulating power capacitor; and the second diode makes the second inductor to charge the voltage regulating power capacitor thereby accomplishing an energy recycling.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
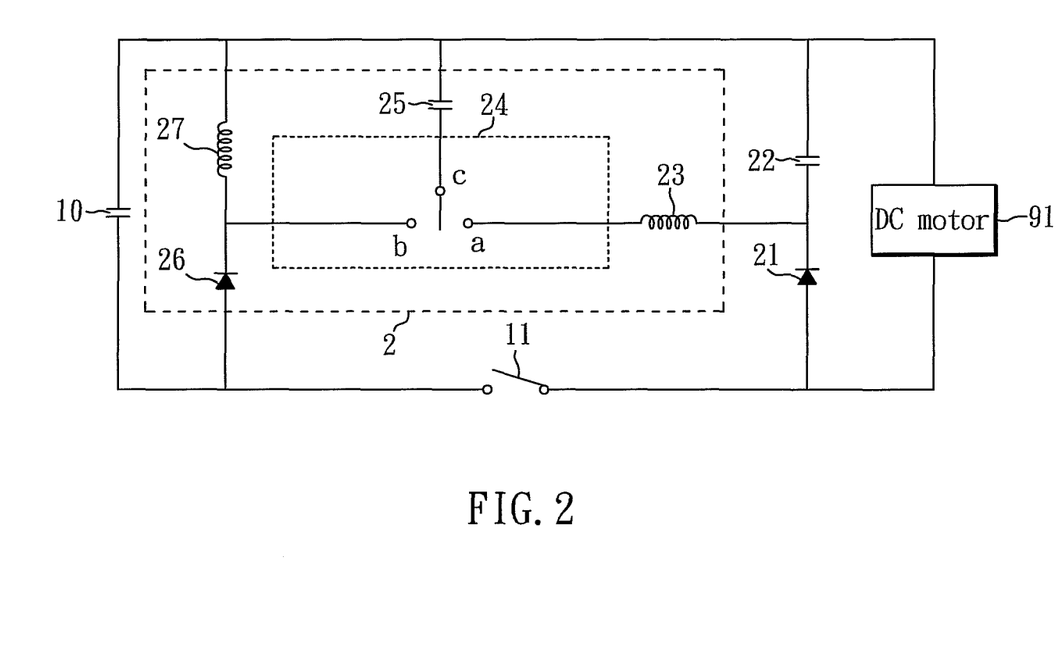
FIG. 2 is a circuit diagram of a motor energy recycling device according to a preferred embodiment of the invention.

FIG. 2 is a circuit diagram of a motor energy recycling device 2 according to a preferred embodiment of the invention. As shown in FIG. 2, the motor energy recycling device 2 is connected to a DC motor 91, a voltage regulating power capacitor 10, and a switch unit 11. The motor energy recycling device 2 includes a first diode unit 21, a first capacitor 22, a first inductor 23, a switching device 24, a second capacitor 25, a second diode unit 26, and a second inductor 27. The switching device 24 has a first end 'a', a second end 'b', and a third end 'c'.

The voltage regulating power capacitor 10 provides a power required for the DC motor 91. The switch unit 11 is provided to control the DC motor 91, so that, when the switch unit 11 is open-circuited, the energy released by the DC motor 91 in running is used to continuously charge the first capacitor 22 for energy storage. The first capacitor 22 is connected to the DC motor 91 and the first diode unit 21. Further, the first capacitor 22 is connected between the first inductor 23 and the second capacitor 25. The first inductor 23 is connected to the first end 'a'. The second capacitor 25 is connected to the third end 'c'. The switching device 24 can be switched to make the third end 'c' connected with the first end 'a', or the third end 'c' connected with the second end 'b'. The second end 'b' of the switching device 24 is connected between the second inductor 27 and the second diode 26. The other end of the second inductor 27 is connected between the second capacitor 25 and the voltage regulating power capacitor 10. The second diode unit 26 makes the second inductor 27 to charge the voltage regulating power capacitor 10 to thereby accomplish energy recycling.

Figure 3A:
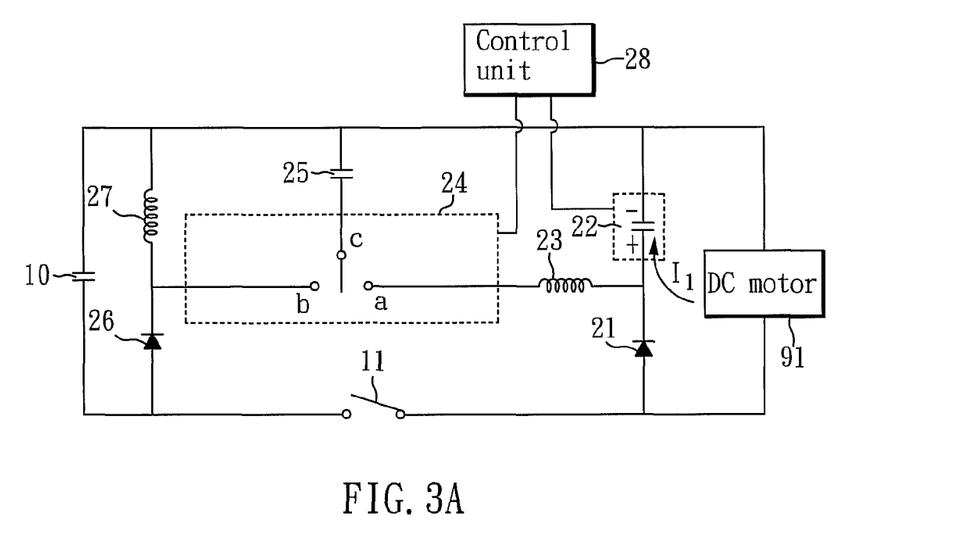
FIG. 3A is a schematic diagram illustrating an operation of the motor energy recycling device used in a DC motor control circuit.

FIGS. 3A to 3D are schematic diagrams illustrating operations of the motor energy recycling device 2 used in a DC motor control circuit according to a preferred embodiment of the invention. As shown in FIG. 3A, the DC motor 91 releases the excessive energy to thereby generate a current $I_1$ which charges the first capacitor 22. The motor energy recycling device 2 preferably uses a control unit 28 to control the switching device 24. The control unit 28 is connected to the first capacitor 22 and the switching device 24 in order to control the switching device 24 based on the voltage of the first capacitor 22. When the voltage of the first capacitor 22 is over a predetermined voltage, the switching device 24 is switched at a switching frequency to alternately make a connection between the third end 'c' and the first end 'a' or between the third end 'c' and the second end 'b'. In this case, the predetermined voltage can be, for example, 100V. Namely, when the first capacitor 22 has a voltage accumulated over 100V, the switching device 24 starts to work.

Figure 3B:
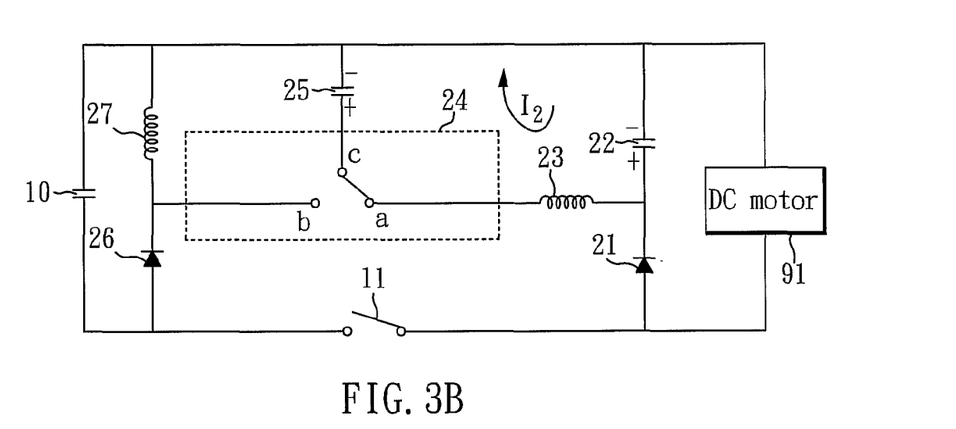
FIG. 3B is a schematic diagram illustrating another operation of a motor energy recycling device used in a DC motor control circuit.
Figure 3C:
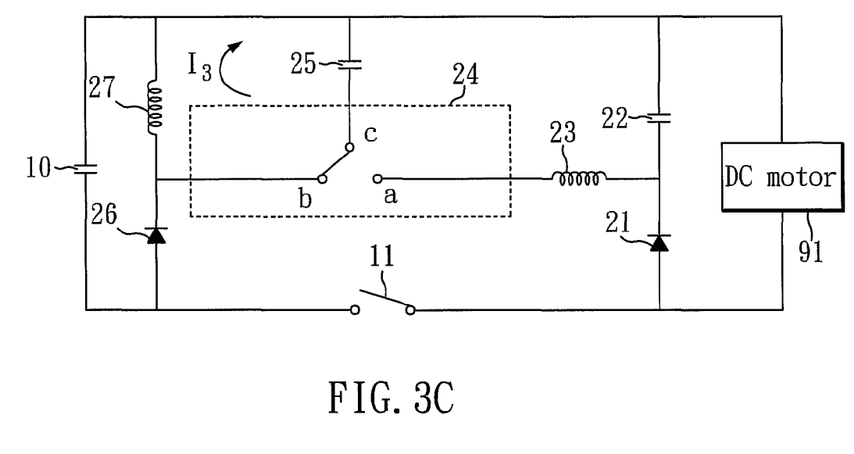
FIG. 3C is a schematic diagram illustrating a further operation of a motor energy recycling device used in a DC motor control circuit.
Figure 3D:
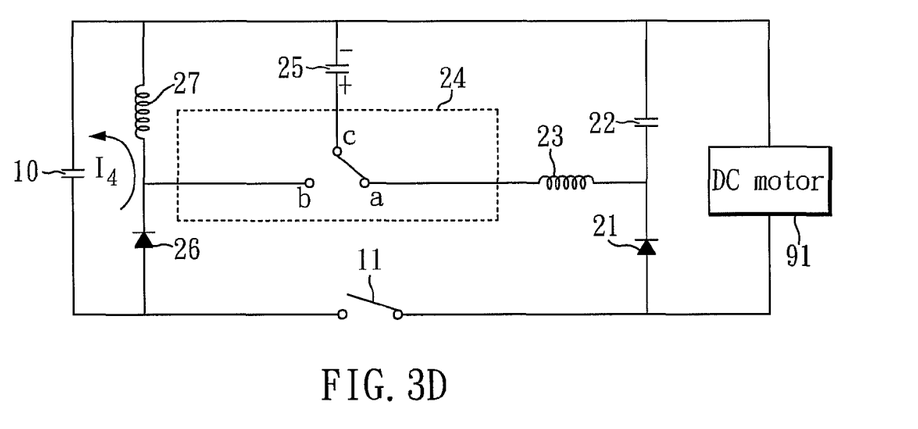
FIG. 3D is a schematic diagram illustrating another further operation of a motor energy recycling device used in a DC motor control circuit.

As shown in FIG. 3B, when the third end 'c' is connected with the first end 'a', a second current $I_2$ is generated. Namely, the first capacitor 22 charges the second capacitor 25 through the first inductor 23 for energy storage. As shown in FIG. 3C, when the third end 'c' is connected with the second end 'b', the energy stored in the second capacitor 25 generates a third current $I_3$ which charges the second inductor 27 for energy storage. As shown in FIG. 3D, when the second inductor 27 is stored with energy, a fourth current $I_4$ is generated to charge the voltage regulating power capacitor 10 so as to accomplish energy recycling.

In this embodiment, for each switching the higher the switching frequency of the switching device 24, the smaller the energy delivered from the first capacitor 22 to the second inductor 27, so that the energy continuously recycled to the voltage regulating power capacitor 10 becomes more even, and thus the motor can be controlled more steadily. In addition, when the predetermined voltage is set to a high voltage, it causes the switching device 24 to start working at the high voltage, so as to achieve a higher recycling efficiency since the recycled energy consumed by the first diode 21 and the second diode 26 is reduced.

Figure 4A:
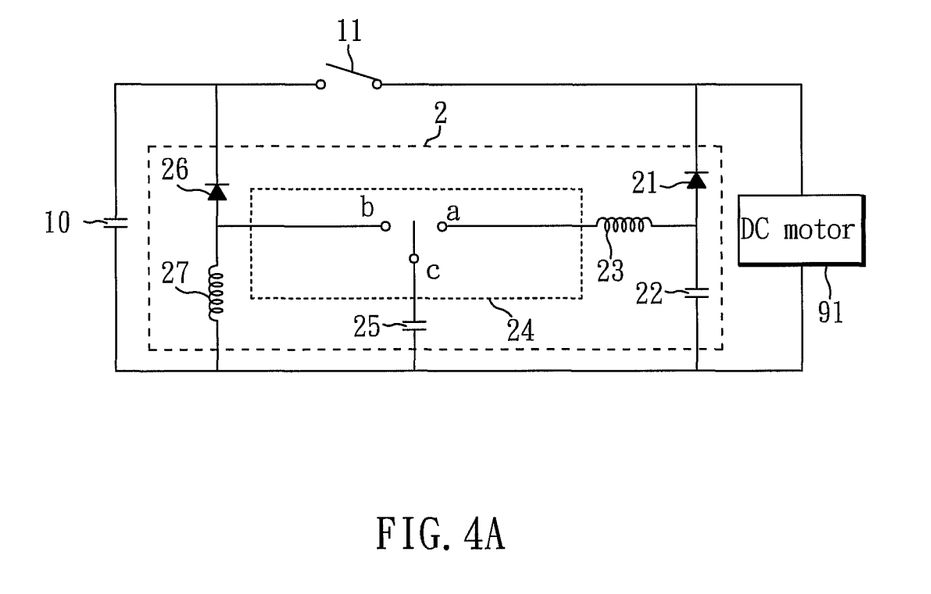
FIG. 4A is a circuit diagram of a motor energy recycling device used in a DC motor control circuit according to another preferred embodiment of the invention.

FIG. 4A is a circuit diagram of a motor energy recycling device 2 used in a DC motor control circuit according to another preferred embodiment of the invention. This embodiment is symmetric with the previous embodiment. As shown in FIG. 4A, similarly, the energy released by the DC motor 91 is stored in the first capacitor 22, and the switching unit 24 is switched to make a connection between the third end 'c' and the first end 'a' or between the third end 'c' and the second end 'b' alternately. Thus, the energy is delivered through the second capacitor 25 from the first capacitor 22 to the second inductor 27, and then the second inductor 27 charges the voltage-regulating power capacitor 10 to accomplish the energy recycling.

Figure 4B:
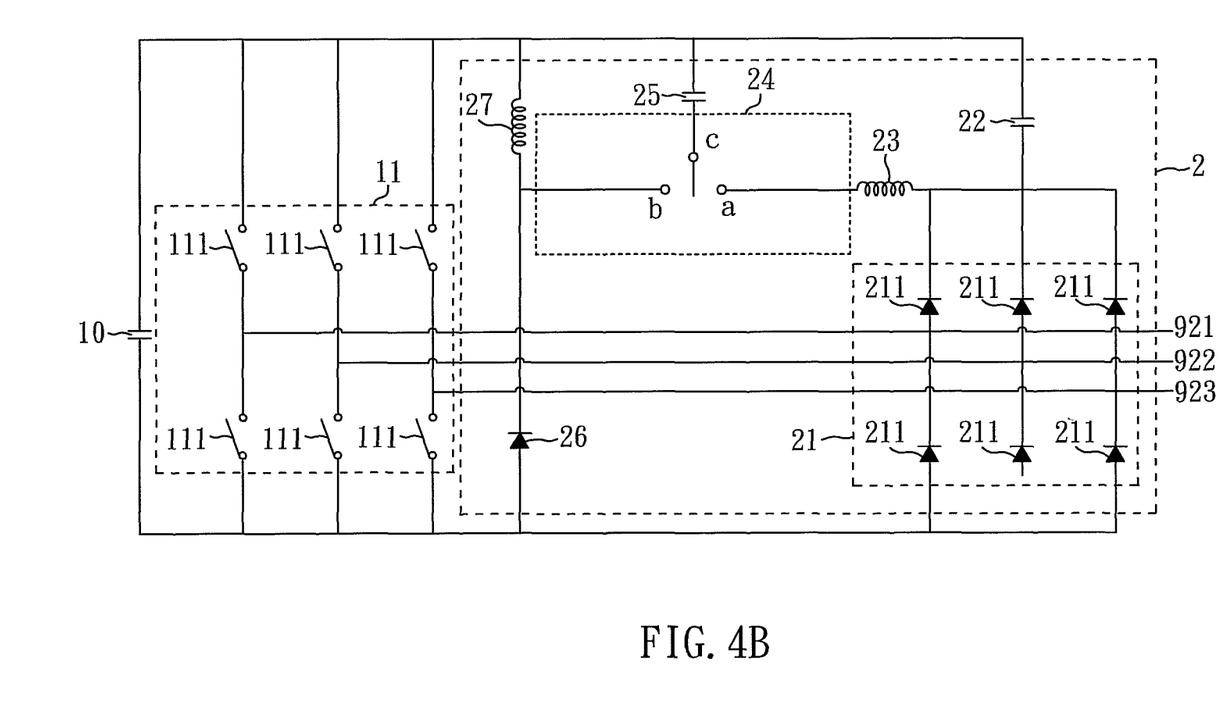
FIG. 4B is a circuit diagram of a motor energy recycling device used in a three phase AC motor controller according to a further preferred embodiment of the invention.
Figure 4C:
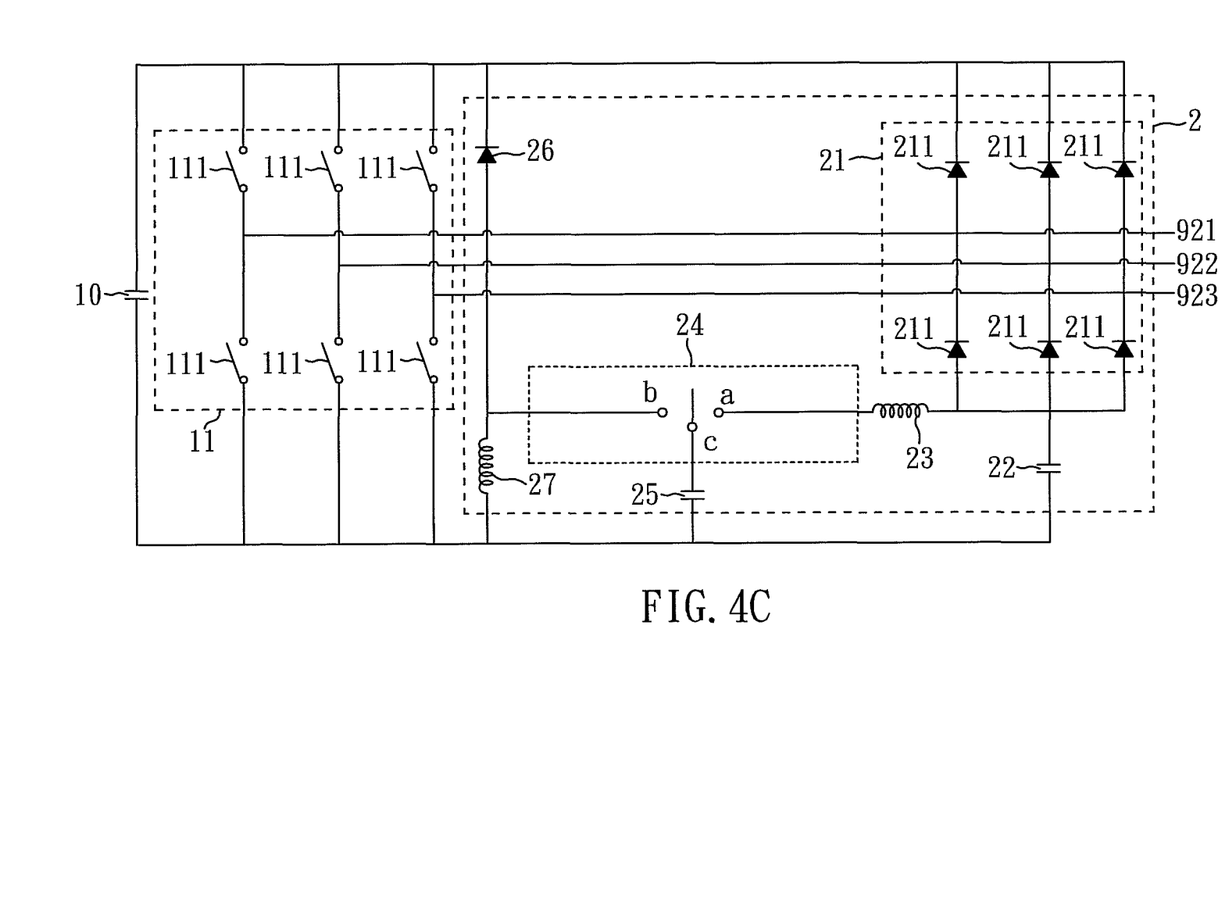
FIG. 4C is a circuit diagram of a motor energy recycling device used in a three phase AC motor control circuit according to another further preferred embodiment of the invention.

With reference to FIGS. 4B and 4C, FIG. 4B is a circuit diagram of the motor energy recycling device 2 used in a three phase AC motor control circuit, and FIG. 4C is a circuit diagram of the motor energy recycling device 2 used in a three phase AC motor control circuit. The circuit of FIG. 4B is symmetric with that of FIG. 4C. As shown, the three phase AC motor has a first phase 921, a second phase 922, and a third phase 923. The motor energy recycling device 2 is connected to the three phase AC motor, the voltage regulating power capacitor 10, and a switch unit 11. The switch unit 11 has six switches 111 respectively corresponding to current in/out of the first phase 921, the second phase 922, and the third phase 923. The switch unit 11 configures the three phase AC motor into one-in/two-out mode or two-in/one-out mode to thereby form a loop of running the three phase AC motor. The first diode unit 21 of the recycling device 2 has six first diodes 211. Each of the first phase 921, second phase 922, and third phase 923 of the three phase AC motor is connected to corresponding two switches 111 and two first diodes 211 to thereby control the running mode of the three phase AC motor.

In this embodiment, the energy released by the first phase 921, second phase 922, and third phase 923 of the three phase AC motor is stored in the first capacitor 22 through the corresponding first diodes 211, respectively. Similar to the previous embodiments, the switching unit 24 is switched to make a connection between the third end 'c' and the first end 'a' or between the third end 'c' and the second end 'b' alternately. Thus, the energy is delivered through the second capacitor 25 from the first capacitor 22 to the second inductor 27, and the second inductor 27 charges the voltage regulating power capacitor 10 to thereby accomplish the energy recycling. Therefore, the invention can effectively achieve the effect of recycling the energy released by the motor.

As cited, the motor energy recycling device is connected to the motor and the control circuit, such that the energy released by the motor can be stored in a first capacitor and energy transfer starts when the voltage of the first capacitor is accumulated to reach a predetermined voltage, for example, a voltage of 100V, which can be configured by the user. The larger the predetermined voltage value, the higher the recycling efficiency.

In addition, the motor energy recycling device makes use of an alternately switching unit at a frequency to thereby transfer the energy. The energy of the first capacitor is transferred first to the second capacitor and then to the second inductor, and finally the voltage regulating power capacitor is charged via the second inductor to thereby accomplish the energy recycling. The motor energy recycling device recycles the energy at a number of transfers each with a small amount of fixed energy, which only causes a small voltage change every time charging the voltage regulating power capacitor. Therefore, the operation and rotating speed of the motor are not affected, and the high safety is achieved.

Although the present invention has been explained in relation to its preferred embodiment, it is to be understood that many other possible modifications and variations can be made without departing from the spirit and scope of the invention as hereinafter claimed.

What is claimed is:

1. A motor energy recycling device, which is connected to a motor, a voltage regulating power capacitor for providing power required for the motor, and a switch unit for controlling the motor, the motor energy recycling device used to store energy released by the motor comprising:
   a switching device having a first end, a second end and a third end for being switched to connect the third end with the first end or with the second end;
   a first diode unit;
   a first capacitor connected to the motor and the first diode unit so as to use energy released by the motor to charge the first capacitor;
   a second capacitor connected to the third end;
   a first inductor connected to the first end and connected between the first capacitor and the first diode;
   a second diode unit; and
   a second inductor connected to the second diode and the second end so as to charge the voltage regulating power capacitor thereby accomplishing an energy recycling.

2. The motor energy recycling device as claimed in claim 1, wherein the switch unit controls the motor such that the first capacitor is continuously charged by energy released by the motor in running when the switch unit is open-circuited.

3. The motor energy recycling device as claimed in claim 1, wherein the first capacitor charges the second capacitor through the first inductor for energy storage when the third end is connected with the first end.

4. The motor energy recycling device as claimed in claim 1, wherein energy stored in the second capacitor is transferred to the second inductor for energy storage when the third end is connected with the second end.

5. The motor energy recycling device as claimed in claim 1, wherein the voltage regulating power capacitor is charged when the second inductor is stored with energy and when the third end is not connected with the second end.

6. The motor energy recycling device as claimed in claim 1, wherein the switching device is alternately switched to connect the third end with the first end or connect the third end with the second end when the first capacitor has a voltage over a predetermined voltage.

7. The motor energy recycling device as claimed in claim 6, further comprising a control unit connected to the first capacitor and the switching device for controlling the switching device based on the voltage of the first capacitor.

8. The motor energy recycling device as claimed in claim 1, wherein the motor is a DC motor.

9. The motor energy recycling device as claimed in claim 1, wherein the motor is a three phase AC motor having a first phase, a second phase and a third phase; the switch unit has six switches respectively corresponding to in/out of the first phase, the second phase, and the third phase, and the first diode unit has six first diodes; each of the first to third phases is connected to corresponding two switches and two first diodes for controlling the motor.

* * * * *